US011933192B2

(12) United States Patent
Joo

(10) Patent No.: US 11,933,192 B2
(45) Date of Patent: Mar. 19, 2024

(54) TURBINE VANE, AND TURBINE AND GAS TURBINE INCLUDING SAME

(71) Applicant: DOOSAN ENERBILITY CO., LTD., Changwon-si (KR)

(72) Inventor: Hyun Woo Joo, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/935,117

(22) Filed: Sep. 25, 2022

(65) Prior Publication Data

US 2023/0128974 A1 Apr. 27, 2023

(30) Foreign Application Priority Data

Oct. 27, 2021 (KR) ........................ 10-2021-0145023

(51) Int. Cl.
*F01D 5/14* (2006.01)
*F01D 5/18* (2006.01)
*F01D 9/02* (2006.01)

(52) U.S. Cl.
CPC ............. *F01D 5/143* (2013.01); *F01D 5/187* (2013.01); *F01D 9/02* (2013.01); *F05D 2240/126* (2013.01); *F05D 2240/80* (2013.01); *F05D 2240/81* (2013.01); *F05D 2250/32* (2013.01); *F05D 2260/201* (2013.01)

(58) Field of Classification Search
CPC ........................................................ F01D 5/143
See application file for complete search history.

(56) References Cited

U.S. PATENT DOCUMENTS 6,132,174 A 10/2000 Staub
6,478,539 B1 11/2002 Trutschel
6,851,924 B2 * 2/2005 Mazzola ................ F01D 5/145 415/115
9,017,030 B2 * 4/2015 Beeck ..................... F01D 5/141 416/193 A
9,920,633 B2 * 3/2018 Bergman ................ F01D 5/143
9,932,834 B2 4/2018 Hough
(Continued)

FOREIGN PATENT DOCUMENTS

JP H10252405 A 9/1998
JP 6780713 B2 10/2020
(Continued)

OTHER PUBLICATIONS

KR OA, dated Sep. 26, 2023.

*Primary Examiner* — Eldon T Brockman
(74) *Attorney, Agent, or Firm* — Harvest IP Law, LLP

(57) ABSTRACT

A turbine vane includes an airfoil having a leading edge and a trailing edge, an inner shroud disposed at one end of the airfoil to support the airfoil, and an outer shroud disposed opposite to the inner shroud at the other end of the airfoil to support the airfoil, wherein a corner part is formed at a portion where the airfoil and the inner shroud or the outer shroud meet, the corner part including a first round portion connected in an arc shape to the inner shroud or the outer shroud, a first inclined portion connected to the first round portion and outwardly extending in an inclined shape, and a second round portion connected to the first inclined portion and outwardly extending in an arc shape.

20 Claims, 4 Drawing Sheets

(56) References Cited

U.S. PATENT DOCUMENTS

| | | | | |
|---|---|---|---|---|
| 2004/0062636 | A1* | 4/2004 | Mazzola | F01D 5/145 415/115 |
| 2013/0101409 | A1* | 4/2013 | Beeck | F01D 5/141 415/208.2 |
| 2016/0258296 | A1* | 9/2016 | Bergman | F01D 5/143 |
| 2019/0024673 | A1 | 12/2019 | Anderson | |
| 2020/0149398 | A1 | 5/2020 | Leon | |

FOREIGN PATENT DOCUMENTS

| | | | |
|---|---|---|---|
| KR | 20150082944 | A | 7/2015 |
| KR | 101654530 | B1 | 9/2016 |
| KR | 102048874 | B1 | 11/2019 |

* cited by examiner

TURBINE VANE, AND TURBINE AND GAS TURBINE INCLUDING SAME

CROSS REFERENCE TO RELATED APPLICATION

The present application claims priority to Korean Patent Application No. 10-2021-0145023, filed on Oct. 27, 2021, the entire contents of which are incorporated herein for all purposes by this reference.

BACKGROUND OF THE INVENTION

1. Field of the Invention

The present disclosure relates to a turbine vane, and a turbine and a gas turbine including the same.

2. Description of the Background Art

Generally, a gas turbine is a combustion engine in which a mixture of air compressed by a compressor and fuel is combusted to produce a high temperature gas that drives a turbine. The gas turbine is used to drive electric generators, aircraft, ships, trains, or the like.

The gas turbine generally includes a compressor, a combustor, and a turbine. The compressor serves to intake external air, compress the air, and transfer the compressed air to the combustor. The compressed air compressed by the compressor has a high temperature and a high pressure. The combustor serves to mix compressed air from the compressor and fuel and combust the mixture of compressed air and fuel to produce combustion gases, which are discharged to the turbine. The combustion gases drive turbine blades in the turbine to produce power. The power generated through the above processes is applied to a variety of applications such as generation of electricity, driving of mechanical units, etc.

Recently, in order to increase the efficiency of a turbine, the temperature of the gas flowing into the turbine (Turbine Inlet Temperature: TIT) is continuously increasing, and thus, the importance of heat-resistant treatment and cooling of turbine blades has been highlighted.

The turbine vane may include an inner shroud, an outer shroud, and an airfoil disposed between the inner and outer shrouds. A corner part is formed at a portion where the airfoil and the inner shroud or the outer shroud meet, and there is a problem in that stress is concentrated at the corner part and thus cracks may occur.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure provides various advantages over prior arts including a turbine vane having improved structural strength, and a turbine and a gas turbine including the same.

In an aspect of the present disclosure, a turbine vane includes: an airfoil having a leading edge and a trailing edge; an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part including: a first round portion connected in an arc shape to the inner shroud or the outer shroud; a first inclined portion connected to the first round portion and outwardly extending in an inclined shape; and a second round portion connected to the first inclined portion and outwardly extending in an arc shape.

In an exemplary embodiment, a radius of curvature of the first round portion may be smaller than a radius of curvature of the second round portion.

In an exemplary embodiment, a height of the first inclined portion may be greater than a height of the first round portion.

In an exemplary embodiment, a height of the second round portion may be smaller than a height of the first round portion.

In an exemplary embodiment, the corner part may further include a second inclined portion connected to the second round portion and outwardly extending in an inclined shape.

In an exemplary embodiment, the corner part may further include a third round portion connected to the second inclined portion and outwardly extending in an arc shape so as to be connected to the airfoil.

In an exemplary embodiment, a height of the second inclined portion may be greater than a height of the first inclined portion.

In an exemplary embodiment, a radius of curvature of the second round portion may be smaller than radii of curvature of the first round portion and the third round portion.

In another aspect of the present disclosure, a turbine includes: one or more rotatable rotor disks; a plurality of turbine blades installed on the one or more rotor disks; and a plurality of turbine vanes disposed between the turbine blades, wherein each of the turbine vane includes: an airfoil having a leading edge and a trailing edge; an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part including: a first round portion connected in an arc shape to the inner shroud or the outer shroud; a first inclined portion connected to the first round portion and outwardly extending in an inclined shape; and a second round portion connected to the first inclined portion and outwardly extending in an arc shape.

In an exemplary embodiment, a radius of curvature of the first round portion may be smaller than a radius of curvature of the second round portion.

In an exemplary embodiment, a height of the first inclined portion may be greater than a height of the first round portion.

In an exemplary embodiment, a height of the second round portion may be smaller than a height of the first round portion.

In an exemplary embodiment, the corner part may further include a second inclined portion connected to the second round portion and outwardly extending in an inclined shape.

In an exemplary embodiment, the corner part may further include a third round portion connected to the second inclined portion and outwardly extending in an arc shape so as to be connected to the airfoil.

In an exemplary embodiment, a height of the second inclined portion may be greater than a height of the first inclined portion.

In an exemplary embodiment, a radius of curvature of the second round portion may be smaller than radii of curvature of the first round portion and the third round portion.

In a further aspect of the present disclosure, a gas turbine includes a compressor compressing air introduced from the outside; a combustor mixing the compressed air by the compressor with fuel and combusting an air-fuel mixture; and a turbine having a plurality of turbine blades rotating by combustion gases combusted by the combustor, wherein the turbine includes: one or more rotatable rotor disks; a plurality of turbine blades installed on the one or more rotor disks; and a plurality of turbine vanes disposed between the turbine blades, wherein each of the turbine vane includes: an airfoil having a leading edge and a trailing edge; an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part including: a first round portion connected in an arc shape to the inner shroud or the outer shroud; a first inclined portion connected to the first round portion and outwardly extending in an inclined shape; and a second round portion connected to the first inclined portion and outwardly extending in an arc shape.

In an exemplary embodiment, a radius of curvature of the first round portion may be smaller than a radius of curvature of the second round portion.

In an exemplary embodiment, a height of the first inclined portion may be greater than a height of the first round portion.

In an exemplary embodiment, a height of the second round portion may be smaller than a height of the first round portion.

According to the turbine vane and turbine according to an aspect of the present disclosure, since the corner part includes the first round portion, the second round portion, and the first inclined portion, it is possible to prevent cracks from occurring in the corner part.

DETAILED DESCRIPTION OF THE INVENTION

Figure 1:
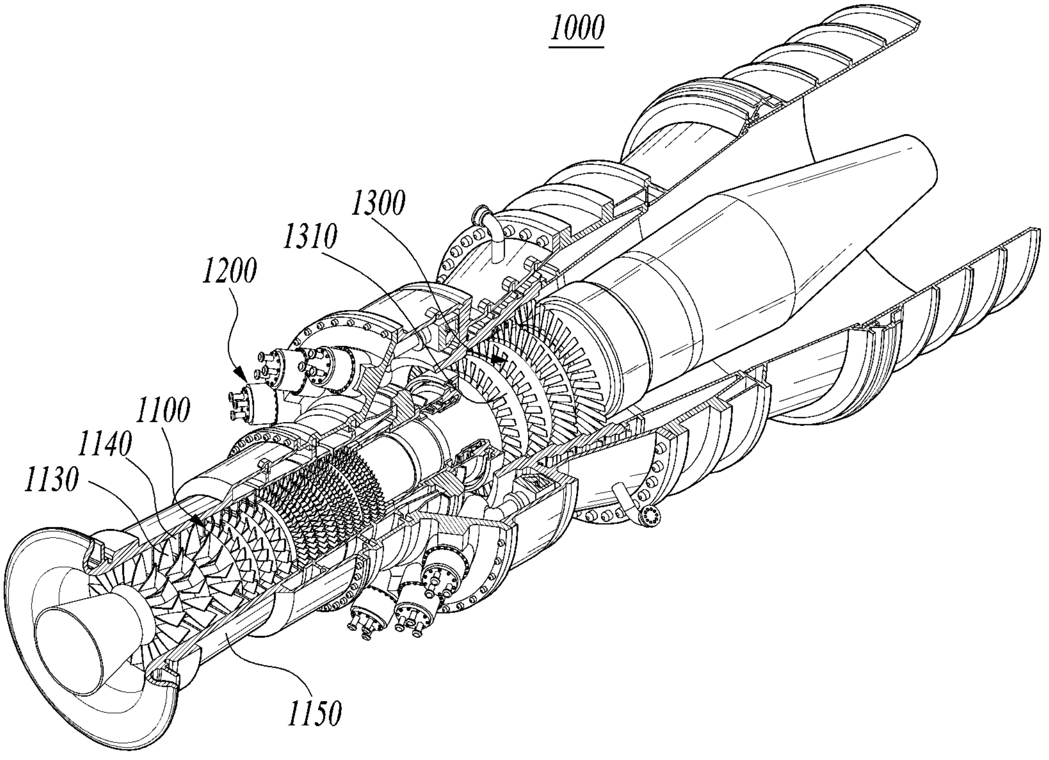
FIG. 1 is a view illustrating the interior of a gas turbine according to the present disclosure.

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols whenever possible. Further, the detailed description of known functions and configurations that may obscure the gist of the present disclosure will be omitted. For the same reason, some of the elements in the drawings are exaggerated, omitted, or schematically illustrated.

Hereinafter, gas turbines according to various embodiments of the present disclosure will be described.

Figure 2:
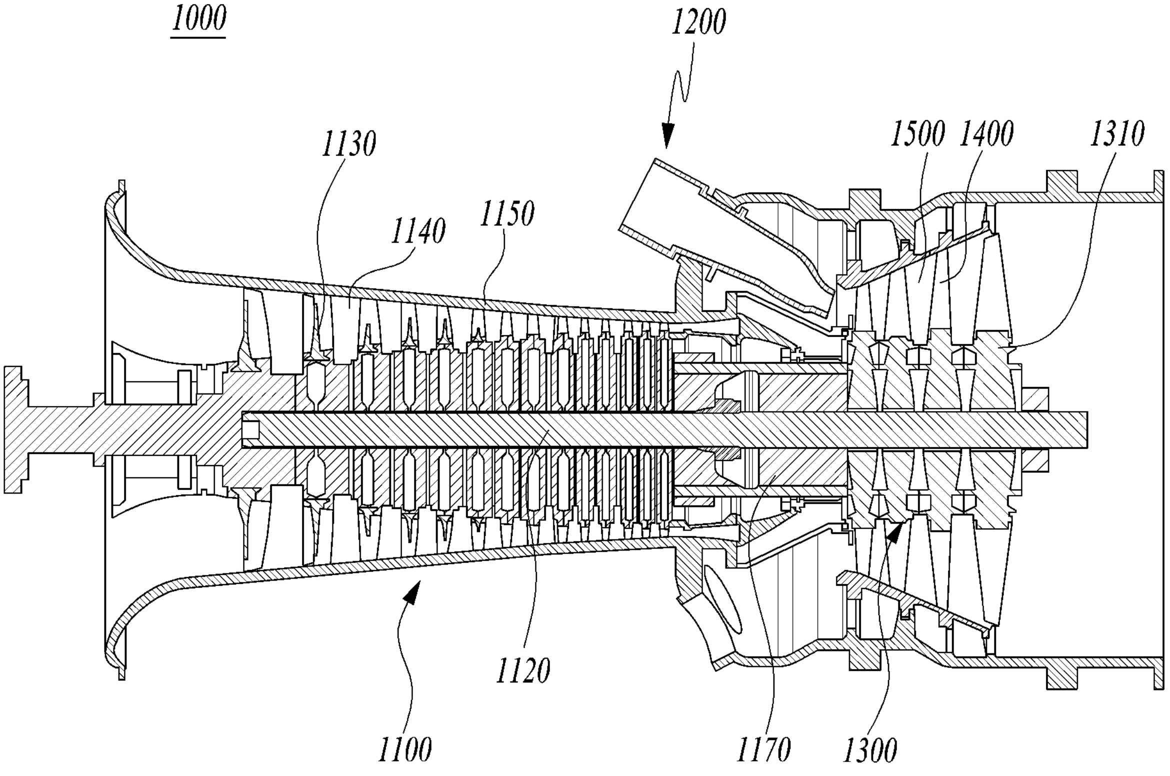
FIG. 2 is a longitudinal-sectional view illustrating a part of the gas turbine of FIG. 1.

FIG. 1 is a view illustrating the interior of a gas turbine according to an embodiment of the present disclosure, and FIG. 2 is a longitudinal-sectional view of the gas turbine of FIG. 1.

Referring to FIGS. 1 and 2, an ideal thermodynamic cycle of a gas turbine 1000 according to the present embodiment follows a Brayton cycle. The Brayton cycle consists of four thermodynamic processes: an isentropic compression (adiabatic compression), an isobaric combustion, an isentropic expansion (adiabatic expansion) and isobaric heat ejection. That is, in the Brayton cycle, atmospheric air is sucked and compressed into high pressure air, mixed gas of fuel and compressed air is combusted at constant pressure to discharge heat energy, heat energy of hot expanded combustion gas is converted into kinetic energy, and exhaust gases containing remaining heat energy is discharged to the outside. That is, gases undergo four thermodynamic processes: compression, heating, expansion, and heat ejection.

As illustrated in FIG. 1, the gas turbine 1000 employing the Brayton cycle includes a compressor 1100, a combustor 1200, and a turbine 1300. Although the following description will be described with reference to FIG. 1, the present disclosure may be widely applied to other turbine engines similar to the gas turbine 1000 illustrated in FIG. 1.

Referring to FIG. 1, the compressor 1100 of the gas turbine 1000 may suck and compress air. The compressor 1100 may serve both to supply the compressed air by compressor blades 1130 to a combustor 1200 and to supply the cooling air to a high temperature region of the gas turbine 1000. Here, since the sucked air undergoes an adiabatic compression process in the compressor 1100, the air passing through the compressor 1100 has increased pressure and temperature.

The compressor 1100 is sometimes designed as a centrifugal compressor or an axial compressor, and the centrifugal compressor is applied to a small-scale gas turbine. In contrast, a multi-stage axial compressor 1100 is generally applied to a large-scale gas turbine 1000 illustrated in FIG. 1 since the large-scale gas turbine 1000 is required to compress a large amount of air. In this case, in the multi-stage axial compressor 1100, the compressor blades 1130 rotate according to the rotation of the central tie rod 1120 and the rotor disks to compress the introduced air and move the compressed air to the compressor vanes 1140 on the rear stage. As the air passes through the blades 1130 formed in multiple stages, the air is compressed to a higher pressure.

The compressor vanes 1140 are mounted inside the housing 1150 in stages. The compressor vanes 1140 guide the compressed air moved from the front side compressor blades 1130 toward the rear-side blades 1130. In one embodiment, at least some of the compressor vanes 1140 may be mounted so as to be rotatable within a predetermined range for adjustment of an air inflow, or the like.

The compressor 1100 may be driven using a portion of the power output from the turbine 1300. To this end, as illustrated in FIG. 1, the rotary shaft of the compressor 1100 and the rotary shaft of the turbine 1300 may be directly connected by a torque tube 1170. In the case of a large-scale gas turbine 1000, almost half of the output produced by the turbine 1300 may be consumed to drive the compressor 1100.

Meanwhile, the combustor 1200 may mix compressed air supplied from the outlet of the compressor 1100 with fuel and combust the air-fuel mixture at a constant pressure to produce a high-energy combustion gas. That is, the combustor 1200 mixes the inflowing compressed air with fuel and combusts the mixture to produce a high-temperature and high-pressure combustion gas with high energy. The temperature of combustion gas may be raised, through an isobaric combustion process, to a temperature that the combustor and turbine parts can withstand without being thermally damaged.

The combustor 1200 may include: a plurality of burners arranged in a housing formed in a cell shape and having a fuel injection nozzle, or the like; a combustor liner forming a combustion chamber; and a transition piece a connection between the combustor and the turbine.

In the meantime, the high-temperature and high-pressure combustion gas from the combustor 1200 is supplied to the turbine 1300. As the supplied high-temperature and high-pressure combustion gas expands, impulse and impact forces are applied to the turbine blades 1400 of the turbine 1300 to generate rotational torque, which is transferred to the compressor 1100 through the torque tube 1170, wherein an excess of power exceeding the power required to drive the compressor 1100 is used to drive a generator, or the like.

The turbine 1300 includes one or more of rotor disks 1310, and a plurality of turbine blades 1400 and turbine vanes 1500 arranged radially on the rotor disk 1310

Each rotor disk 1310 has a substantially disk shape, and a plurality of grooves are formed in the outer circumferential portion thereof. The grooves are formed to have a curved surface, and turbine blades 1400 and vanes 1500 are inserted into the grooves. The turbine blades 1400 may be coupled to the rotor disk 1310 in a manner such as a dovetail connection. The vanes 1500 are fixed to a casing of the gas turbine 1000 so as not to rotate and serve to guide the flow direction of the combustion gas passed through the turbine blades 1400.

Figure 3:
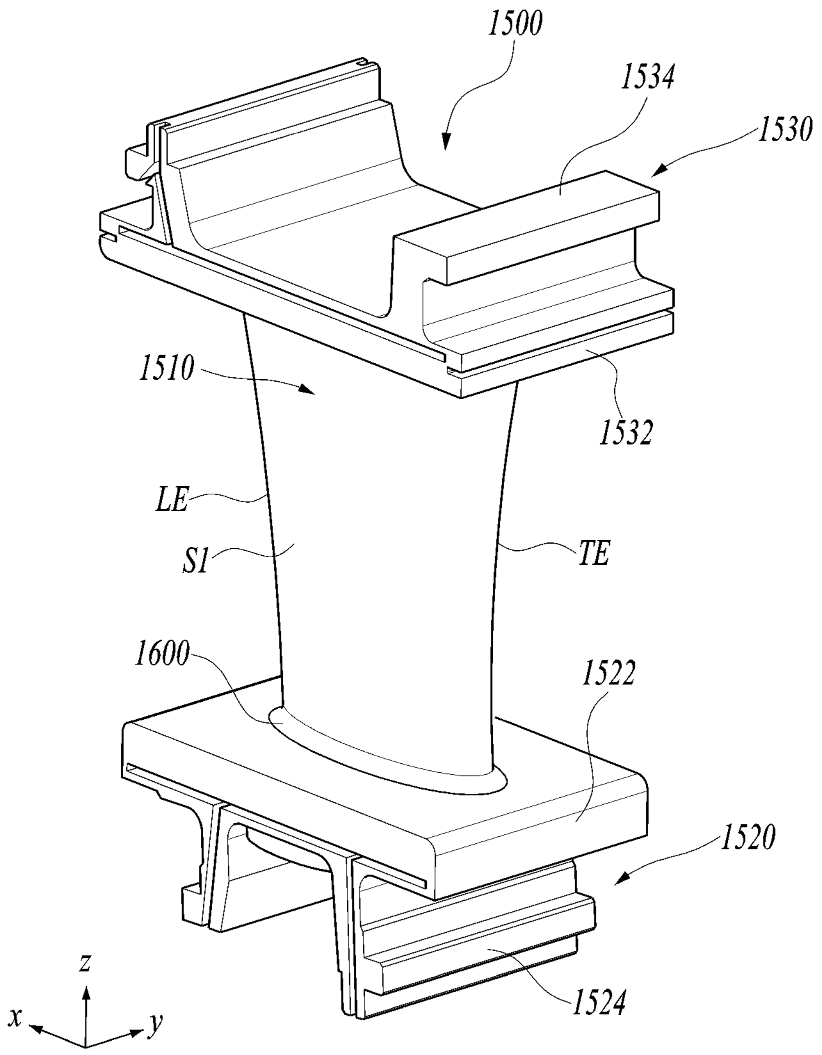
FIG. 3 is a perspective view illustrating a turbine vane according to an embodiment of the present disclosure.
Figure 4:
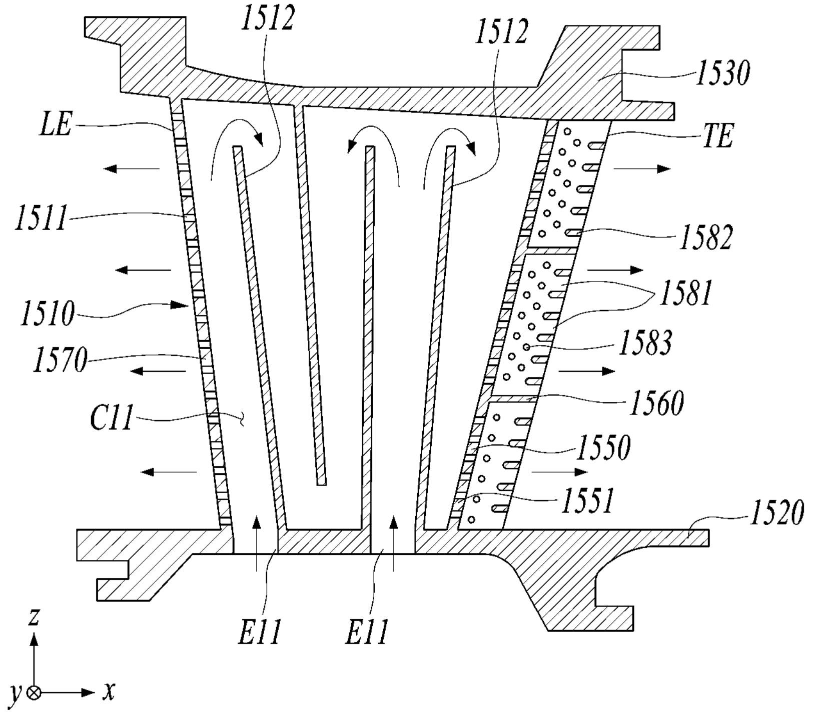
FIG. 4 is a longitudinal-sectional view illustrating the turbine vane according to an embodiment of the present disclosure, which is cut along a direction from the leading edge toward the trailing edge of the turbine vane.
Figure 5:
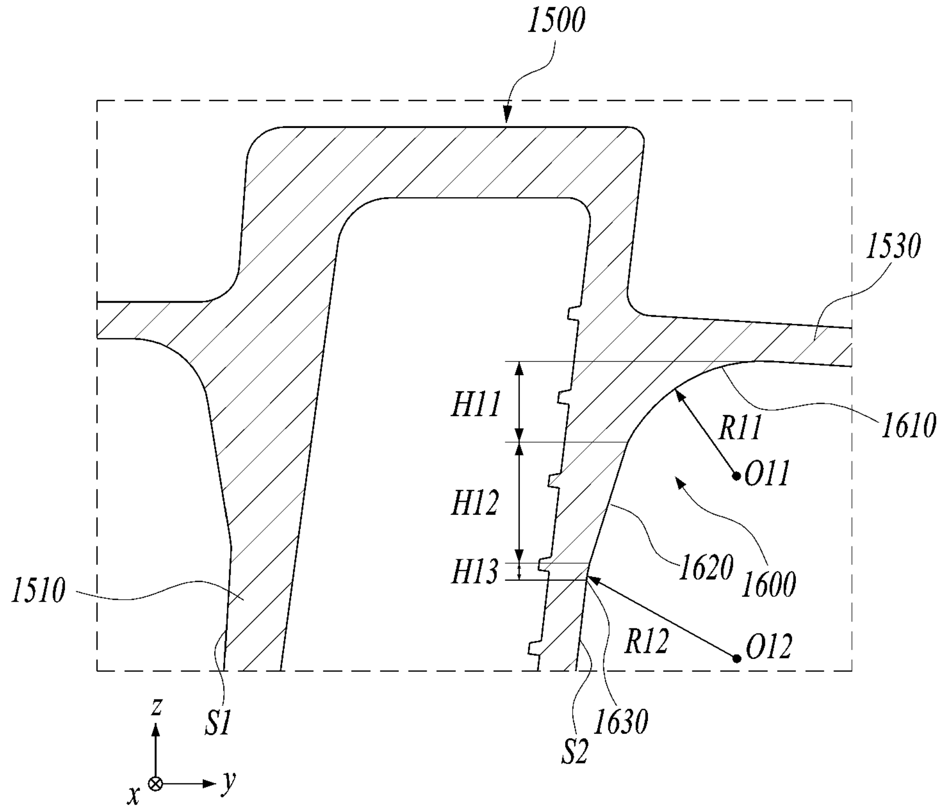
FIG. 5 is a partial sectional view of the turbine vane according to an embodiment of the present disclosure, which is cut along a direction from a pressure surface and toward a suction surface of the turbine vane.

FIG. 3 is a perspective view illustrating a turbine vane according to a first embodiment of the present disclosure, FIG. 4 is a longitudinal-sectional view illustrating the turbine vane according to the first embodiment of the present disclosure, which is, which is cut along a direction from the leading edge toward the trailing edge of the turbine vane, and FIG. 5 is a partial sectional view of the turbine vane according to the first embodiment of the present disclosure, which is cut along a direction from a pressure side and toward a suction side of the turbine vane.

Referring to FIGS. 3 to 5, the turbine vane 1500 includes an inner shroud part 1520, an outer shroud part 1530, and an airfoil part 1510 located between the inner shroud part 1520 and the outer shroud part 1530.

The airfoil part 1510 may be formed from an airfoil-shaped curved plate, and may be formed to have an airfoil optimized according to the specifications of the gas turbine 1000. The airfoil part 1510 may include a leading edge LE disposed on an upstream side and a trailing edge TE disposed on a downstream side on the basis of a flow direction of a combustion gas.

In addition, the airfoil part 1510 has a suction surface S1 protruding to form an outwardly convex curved surface and a pressure surface S2 forming a curved surface concavely recessed toward the suction surface S1.

For the purpose of describing the FIGS. 3-5, the direction from the inner shroud part 1520 toward the outer shroud part 1530 is referred to as a direction z or a height direction. The direction z is generally a radial direction from the central tie rod toward the outside of the gas turbine. The direction from the leading edge LE toward the trailing edge TE is referred to as a direction x. The direction from the pressure surface S2 toward the suction surface S1 is referred to as a direction y. The direction y may be referred to as a thickness direction.

The inner shroud part 1520 is coupled to an internal structure of the turbine 1300 and is disposed at an inner end of the airfoil part 1510 to support the airfoil part 1510. The inner shroud part 1520 includes an inner platform 1522 coupled to an inner side of the airfoil part 1510 and an inner hook 1524 protruding downward from the inner platform 1522. An inlet E11 connected to a cooling path C11 is formed in the inner platform 1522, and cooling air may be introduced into the airfoil part 1510 through the inlet E1. In this embodiment, the inner platform 1522 is illustrated as having two inlets E11 formed, but the present disclosure is not limited thereto and a single inlet or more than two inlets may be provided.

The outer shroud part 1530 is coupled to a vane carrier (not shown) installed on a radially outer side and is disposed at an outer end of the airfoil part 1510 to support the airfoil part 1510. The outer shroud part 1530 includes an outer platform 1532 coupled to the outer end of the airfoil part 1510 and an outer hook 1534 protruding above the outer platform 1532 and coupled to the vane carrier.

The airfoil part 1510 may include an outer wall 1570 forming an outer shape, cooling paths C11 formed in the outer wall 1570, partition plates 1512, and a perforated plate 1550. The cooling paths C11 are connected to the inlet E11 or other cooling paths C11 to receive cooling air therethrough.

A plurality of cooling holes 1511 are formed on the surface of the airfoil part 1510, and the cooling holes 1511 communicate with the cooling paths C11 formed in the airfoil part 1510 to supply cooling air to the surface of the airfoil part 1510.

The perforated plate 1550 may be installed between the trailing edge TE and the cooling path C11 disposed on the rear side of the airfoil part 1510. The perforated plate 1550 extends in the direction z. A plurality of holes 1551 are formed in the perforated plate 1550, and the space between the perforated plate 1550 and the trailing edge TE is divided by partition walls 1560 spaced apart from each other in the direction z of the airfoil part 1510. One side of the partition wall 1560 may be connected to the perforated plate 1550, and the other side of the partition wall 1560 may be connected to the trailing edge TE.

The airfoil part 1510 may further include a plurality of rear end cooling slots 1581 connected to the cooling path C11 to discharge the air from the cooling path C11 and formed to be spaced apart in the direction z of the trailing edge TE, and a plurality of partition protrusions 1582 formed between the rear end cooling slots 1581 to divide the rear end cooling slots 1581. The air introduced into the cooling path C11 through the perforated plate 1550 is discharged through the rear end cooling slots 1581. In addition, a plurality of cooling protrusions 1583 may be formed between the perforated plate 1550 and the trailing edge TE.

FIG. 4 is a longitudinal-sectional view illustrating the turbine vane according to an embodiment of the present disclosure, and FIG. 5 is a partial sectional view of the turbine vane according to an embodiment of the present disclosure. The sectional views of FIGS. 4 and 5 are cut along the direction y.

Referring to FIGS. 4 and 5, a corner part 1600 is formed at a portion where the airfoil 1510 and the inner shroud 1520 or the outer shroud 1530 meet. The corner part 1600 is a portion that may have a greater thickness than the airfoil 1510 and connects the airfoil 1510 and the outer shroud 1530 or the inner shroud 1520. The thickness of the corner part 1600 may be formed to gradually decrease toward the center of the airfoil 1510 in the height direction.

Hereinafter, a corner part 1600 connecting the outer shroud 1530 and the airfoil 1510 will be described as an example. However, it is understandable that similar embodiment may be applied to a corner part 1600 connecting the inner shroud 1520 and the airfoil 1510. The corner part 1600 includes a first round portion 1610 connected to the outer shroud 1530 in an arc shape, a first inclined portion 1620 connected to the first round portion 1610 and outwardly extending from the inner side of the airfoil 1510 in an inclined shape, and a second round portion 1630 connected to the first inclined portion 1620 and outwardly extending from the inner side of the airfoil 1510 in an arc shape.

The first round portion 1610 and the second round portion 1630 may have curved surfaces, and the first inclined portion 1620 may have a flat surface according to an embodiment. The first round portion 1610 may be curved in an arc shape, and may have a first central point O11 and a first radius of curvature R11. The second round portion 1630 may be curved in an arc shape, and may have a second center point O12 and a second radius of curvature R12. Here, the first radius of curvature R11 may be smaller than the second radius of curvature R12 according to an embodiment.

The longitudinal section of the first inclined portion 1620 may be formed in a straight line, and the thickness thereof gradually decreases toward the center of the airfoil 1510 in the height direction (i.e., the direction z). The first round portion connects the first inclined portion and the outer shroud, and the second round portion connects the airfoil 1510 and the first inclined portion 1620.

Meanwhile, the first round portion 1610, the first inclined portion 1620, and the second round portion 1630 may have a first height H11, a second height H12, and a third height H13, respectively. Here, the second height H12 may be greater than the first height H11, and the first height H11 may be greater than the third height H13.

When the corner part 1600 includes the first round portion 1610, the first inclined portion 1620, and the second round portion 1630, as in the embodiments of the present disclosure, the structural strength of the corner part 1600 is improved and it is possible to prevent cracks from occurring in the corner part 1600.

Hereinafter, a turbine vane according to a second embodiment of the present disclosure will be described.

Figure 6:
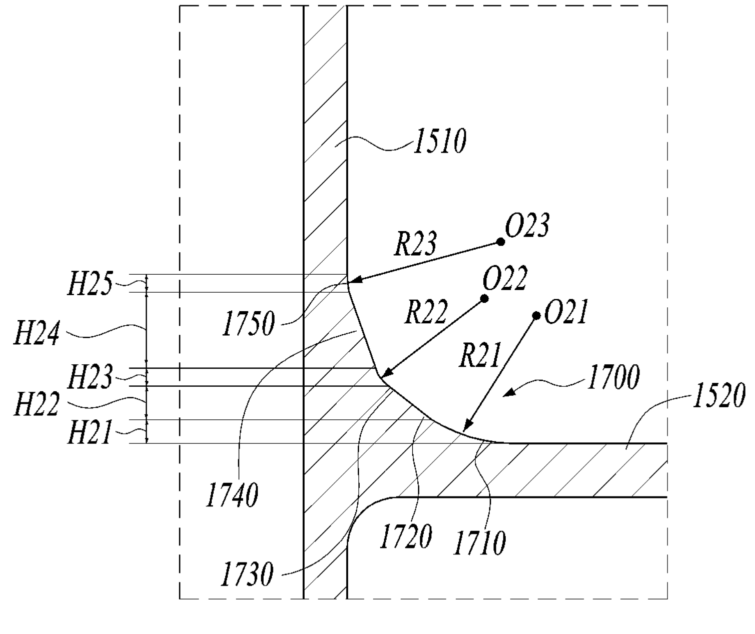
FIG. 6 is a partial sectional view of a turbine vane according to another embodiment of the present disclosure, which is cut along a direction from a pressure surface and toward a suction surface of the turbine vane.

FIG. 6 is a partial sectional view of a turbine vane according to another embodiment of the present disclosure, which is cut along the direction y.

Referring to FIG. 6, the turbine vane 1500 according to this embodiment has the similar configuration as the turbine vane according to the embodiment as in FIG. 5, except for a corner part 1700, so a repeated description for the same configuration will be omitted.

A corner part 1700 is formed at a portion where the airfoil 1510 and the inner shroud 1520 or the outer shroud 1530 meet. Hereinafter, a corner part 1700 connecting the inner shroud 1520 and the airfoil 1510 will be described as an example. However, it is understandable that a similar embodiment may be applied to a corner part 1700 connecting the outer shroud 1530 and the airfoil 1510.

The corner part 1700 may include a first round portion 1710 connected to the inner shroud 1520 in an arc shape, a first inclined portion 1720 connected to the first round portion 1710 and outwardly extending from the inner side of the airfoil 1510 in an inclined shape, a second round portion 1730 connected to the first inclined portion 1720 and outwardly extending from the inner side of the airfoil 1510 in an arc shape, a second inclined portion 1740 connected to the second round portion 1730 and outwardly extending from the inner side of the airfoil 1510 in an inclined shape, and a third round portion 1750 connected to the second inclined portion 1740 and outwardly extending from the inner side of the airfoil 1510 in an arc shape.

The first round portion 1710, the second round portion 1730, and the third round portion 1750 may have a curved surface, and the first inclined portion 1720 and the second inclined portion 1740 may have a flat surface according to an embodiment. The first round portion 1710 may be curved in an arc shape, and may have a first central point O21 and a first radius of curvature R21. The second round portion 1730 may be curved in an arc shape, and may have a second center point O22 and a second radius of curvature R22. In addition, the third round portion 1750 may be curved in an arc shape, and may have a third central point O23 and a third radius of curvature R23.

Here, the second radius of curvature R22 may be smaller than the first radius of curvature R21 and the third radius of curvature R23 according to an embodiment. The first radius of curvature R21 and the third radius of curvature R23 may have the same or different value according to an embodiment.

The longitudinal sections of the first inclined portion 1720 and the second inclined portion 1740 may be formed in a straight line, and the thickness T21 thereof gradually decreases toward the center of the airfoil 1510 in the height direction (i.e., the direction z).

The first round portion 1710 may connect the first inclined portion 1720 and the inner shroud 1520, the second round portion 1730 may connect the first inclined portion 1720 and the second inclined portion 1740, and the third round portion 1750 may connect the second inclined portion 1740 and the airfoil 1510.

Meanwhile, the first round portion 1710, the first inclined portion 1720, the second round portion 1730, the second inclined portion 1740, and the third round portion 1750 may have a first height H21, a second height H22, a third height H23, a fourth height H24, and a fifth height H25, respectively.

Here, the second height H22 may be greater than the first height H21 according to an embodiment, and the first height H21 may be greater than the third height H23 and the fifth height H25 according to an embodiment.

When the corner part 1700 includes the first inclined portion 1720 and the second inclined portion, and the first inclined portion 1720 and the second inclined portion 1740 being connected by the second round portion 1730, as in the embodiment of the present disclosure, the structural strength of the corner part 1700 may be improved and it is possible to prevent cracks from occurring in the corner part 1700.

While the embodiments of the present disclosure have been described, it will be apparent to those skilled in the art that various modifications and variations can be made in the present disclosure through addition, change, omission, or substitution of components without departing from the spirit of the invention as set forth in the appended claims, and such modifications and changes may also be included within the scope of the present disclosure.

Also, it is apparent that any one feature of an embodiment of the present disclosure described in the specification may be applied to another embodiment of the present disclosure.

The invention claimed is:

1. A turbine vane comprising:

an airfoil having a leading edge and a trailing edge;

an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part comprising:

a first round portion connected in an arc shape to the inner shroud or the outer shroud;

a first inclined portion connected to the first round portion and outwardly extending in an inclined shape, a longitudinal section of the first inclined portion being formed in a straight line; and a second round portion connected to the first inclined portion and outwardly extending in an arc shape, wherein a first curve from a radially outer end and a radially inner end of the first round portion is formed in a first concave curve, having a first central point of the first curve located outside the turbine vane, wherein a second curve from a radially outer end and a radially inner end of the second round portion is formed in a second concave curve, having a second central point of the second curve located outside the turbine vane.

2. The turbine vane according to claim 1, wherein a radius of curvature of the first round portion is smaller than a radius of curvature of the second round portion.

3. The turbine vane according to claim 1, wherein a height of the first inclined portion is greater than a height of the first round portion.

4. The turbine vane according to claim 1, wherein a height of the second round portion is smaller than a height of the first round portion.

5. The turbine vane according to claim 1, wherein the corner part further comprises a second inclined portion connected to the second round portion and outwardly extending in an inclined shape, a longitudinal section of the second inclined portion being formed in a straight line.

6. The turbine vane according to claim 5, wherein a height of the second inclined portion is greater than a height of the first inclined portion.

7. The turbine vane according to claim 5, wherein the corner part further comprises a third round portion connected to the second inclined portion and outwardly extending in an arc shape so as to be connected to the airfoil.

8. The turbine vane according to claim 7, wherein a radius of curvature of the second round portion is smaller than radii of curvature of the first round portion and the third round portion.

9. A turbine comprising:

one or more rotatable rotor disks;

a plurality of turbine blades installed on the one or more rotor disks; and a plurality of turbine vanes disposed between the turbine blades, wherein each of the turbine vanes comprises:

an airfoil having a leading edge and a trailing edge;

an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part comprising:

a first round portion connected in an arc shape to the inner shroud or the outer shroud;

a first inclined portion connected to the first round portion and outwardly extending in an inclined shape, a longitudinal section of the first inclined portion being formed in a straight line; and a second round portion connected to the first inclined portion and outwardly extending in an arc shape, wherein a first curve from a radially outer end and a radially inner end of the first round portion is formed in a first concave curve, having a first central point of the first curve located outside the turbine vane, wherein a second curve from a radially outer end and a radially inner end of the second round portion is formed in a second concave curve, having a second central point of the second curve located outside the turbine vane.

10. The turbine according to claim 9, wherein a radius of curvature of the first round portion is smaller than a radius of curvature of the second round portion.

11. The turbine according to claim 9, wherein a height of the first inclined portion is greater than a height of the first round portion.

12. The turbine according to claim 9, wherein a height of the second round portion is smaller than a height of the first round portion.

13. The turbine according to claim 9, wherein the corner part further comprises a second inclined portion connected to the second round portion and outwardly extending in an inclined shape, a longitudinal section of the second inclined portion being formed in a straight line.

14. The turbine according to claim 13, wherein a height of the second inclined portion is greater than a height of the first inclined portion.

15. The turbine vane according to claim 13, wherein the corner part further comprises a third round portion connected to the second inclined portion and outwardly extending in an arc shape so as to be connected to the airfoil.

16. The turbine according to claim 15, wherein a radius of curvature of the second round portion is smaller than radii of curvature of the first round portion and the third round portion.

17. A gas turbine comprising:

a compressor compressing air introduced from the outside;

a combustor mixing the compressed air by the compressor with fuel and combusting an air-fuel mixture; and a turbine having a plurality of turbine blades rotating by combustion gases combusted by the combustor, wherein the turbine comprises:

one or more rotatable rotor disks;

a plurality of turbine blades installed on the one or more rotor disks; and a plurality of turbine vanes disposed between the turbine blades, wherein each of the turbine vanes comprises:

an airfoil having a leading edge and a trailing edge;

an inner shroud disposed at one end of the airfoil to support the airfoil; and an outer shroud disposed opposite to the inner shroud at the other end of the airfoil to support the airfoil, wherein a corner part is formed at a portion where the airfoil and the inner shroud or the outer shroud meet, the corner part comprising:

a first round portion connected in an arc shape to the inner shroud or the outer shroud;

a first inclined portion connected to the first round portion and outwardly extending in an inclined shape, a longitudinal section of the first inclined portion being formed in a straight line; and a second round portion connected to the first inclined portion and outwardly extending in an arc shape, wherein a first curve from a radially outer end and a radially inner end of the first round portion is formed in a first concave curve, having a first central point of the first curve located outside the turbine vane, wherein a second curve from a radially outer end and a radially inner end of the second round portion is formed in a second concave curve, having a second central point of the second curve located outside the turbine vane.

18. The gas turbine according to claim 17, wherein a radius of curvature of the first round portion is smaller than a radius of curvature of the second round portion.

19. The gas turbine according to claim 18, wherein a height of the first inclined portion is greater than a height of the first round portion.

20. The gas turbine according to claim 17, wherein a height of the second round portion is smaller than a height of the first round portion.

* * * * *